M. E. PFAFF.
VETERINARY MEDICINE SPOON.
APPLICATION FILED DEC. 5, 1910.
1,010,795.
Patented Dec. 5, 1911.
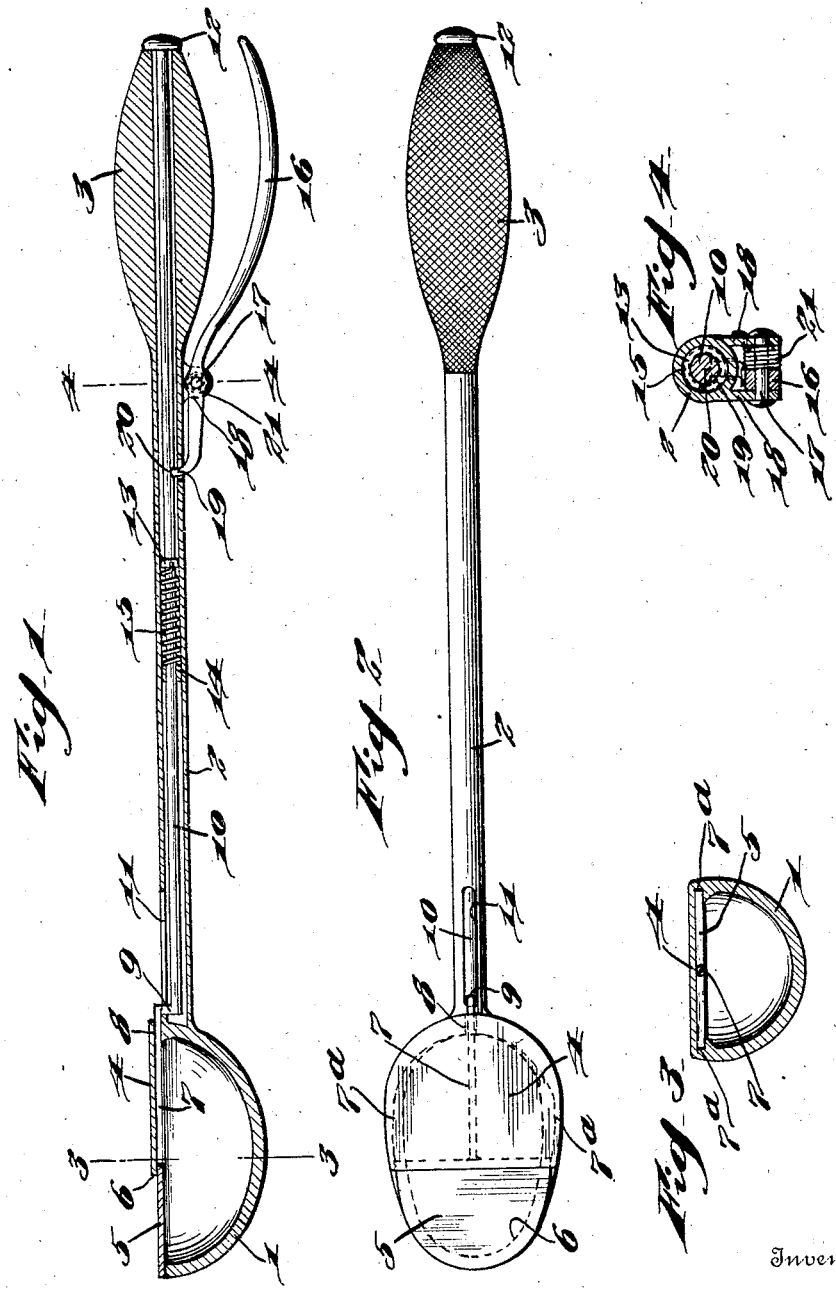

UNITED STATES PATENT OFFICE.

MARY E. PFAFF, OF PHILADELPHIA, PENNSYLVANIA.

VETERINARY MEDICINE-SPOON.

1,010,795.    Specification of Letters Patent.    Patented Dec. 5, 1911.

Application filed December 5, 1910. Serial No. 595,593.

*To all whom it may concern:*

Be it known that I, MARY E. PFAFF, a citizen of the United States, residing at Philadelphia, in the county of Philadelphia and State of Pennsylvania, have invented certain new and useful Improvements in Veterinary Medicine-Spoons, of which the following is a specification.

My invention relates to improvements in veterinary medicine spoons, the object of the invention being to provide an improved device of this character in which the medicine can be effectually held in the body of the spoon, and the gate or cover closing the body of the spoon quickly released when the body is in the mouth of the animal.

A further object is to provide improvements of this character which are of extremely simple construction, neat and attractive in appearance, strong and durable in use.

With these and other objects in view, the invention consists in certain novel features of construction and combinations and arrangements of parts, as will be more fully hereinafter described and pointed out in the claim.

In the accompanying drawings: Figure 1, is a view in longitudinal section illustrating my improvements. Fig. 2, is a plan view. Fig. 3, is a view in cross section on the line 3—3 of Fig. 1, and Fig. 4, is a view in cross section on the line 4—4 of Fig. 1.

1, represents the bowl or body of the spoon to which is fixed or made integral a tubular handle 2, and a grip 3 at its free end. The bowl or body 1 is of general ellipsoidal shape, partially covered as shown at 4, and having a sliding gate or closure 5 adapted to close the opening 6 in the top of the bowl. This gate 5 moves in grooves 7ª in the sides of the bowl, and is connected to a rod 7 which projects through an opening 8 in the rear end of the bowl. Rod 7 is connected by an arm 9 with a rod 10, said arm 9 movable through an elongated slot 11 in the tubular handle 2, while the rod 10 projects all the way through the handle, and is provided with a button 12 on its outer end. On the rod 10 in the handle 2, a collar 13 is fixed and between this collar 13 and the shoulder 14 in the handle, a coiled spring 15 is located and presses against the collar 13 to normally hold the gate 5 in open position.

16, represents a hand lever which is fulcrumed between its ends on a pivot pin 17, the latter supported in perforated ears 18 on the handle. The shorter end of this lever 16 is provided with a tongue 19 adapted to engage in a groove 20 in rod 10 to hold the gate 5 in closed position, and a coiled spring 21 on the pin 17 normally holds the hand lever 16 in this locking position.

In operation, after the bowl of the spoon is filled with the medicine, rod 10 is forced inwardly to move the gate 5 to closed position, said movement being against the pressure of spring 15. When the gate is in closed position, the action of spring 21 on the hand lever 16 will move the tongue 19 into the groove 20, thus locking the gate 5 in closed position. The operator then forces the spoon into the mouth of the animal, and inverts the bowl of the spoon after it is well back in the mouth. While in this position, a movement of the hand lever 16 will release the tongue 19 from the groove 20, and spring 15 will instantly open the gate 5, allowing the medicine to flow into the throat of the animal.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A spoon of the character described, comprising a bowl having a partially closed top, leaving an opening at one end of the bowl, a tubular handle on the bowl, a sliding gate normally open but adapted to be set in position to close the opening of the bowl, said gate movable under the fixed bowl closure, a rod in the handle operating said gate, a spring pressing on said rod to normally hold the gate in open position, said rod having a groove therein, a spring-pressed hand lever, a tongue on said hand lever adapted to engage in said groove to hold the gate in closed position, said rod projecting entirely through said handle, and a button on the outer end of said rod, substantially as described.

In testimony whereof I have signed my name to this specification in the presence of two subscribing witnesses.

MARY E. PFAFF.

Witnesses:
R. H. KRENKEL,
C. E. POTTS.